(12) United States Patent
Salfelner

(10) Patent No.: US 8,607,261 B2
(45) Date of Patent: Dec. 10, 2013

(54) APPARATUS FOR STORING DIGITAL MEDIA THAT INCLUDES A RADIO FREQUENCY IDENTIFICATION SYSTEM

(75) Inventor: Anton Salfelner, Pernegg (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/321,070

(22) PCT Filed: May 18, 2010

(86) PCT No.: PCT/IB2010/052199
§ 371 (c)(1),
(2), (4) Date: Nov. 17, 2011

(87) PCT Pub. No.: WO2010/136931
PCT Pub. Date: Dec. 2, 2010

(65) Prior Publication Data
US 2012/0066702 A1    Mar. 15, 2012

(30) Foreign Application Priority Data

May 27, 2009    (EP) .................................... 09290390

(51) Int. Cl.
*G11B 23/30*    (2006.01)
*G11B 7/24*    (2013.01)

(52) U.S. Cl.
USPC .................. 720/718; 369/273; 340/572.7

(58) Field of Classification Search
USPC ............... 720/718; 369/273, 14, 94; 235/454, 235/439, 487; 340/572.7
See application file for complete search history.

(56) References Cited

U.S. PATENT DOCUMENTS

| 7,404,199 | B2 * | 7/2008 | Arneson et al. | ............... 720/718 |
| 7,710,852 | B2 * | 5/2010 | Oshima et al. | ................ 369/273 |
| 7,823,781 | B2 * | 11/2010 | Pempsell et al. | ............... 235/454 |
| 2004/0052202 | A1 * | 3/2004 | Brollier | .......................... 369/273 |
| 2006/0010463 | A1 * | 1/2006 | Oshima et al. | ................ 720/718 |
| 2006/0261950 | A1 | 11/2006 | Arneson et al. | |
| 2008/0184281 | A1 * | 7/2008 | Ashizaki et al. | ............... 720/646 |
| 2008/0252463 | A1 | 10/2008 | Andrechak et al. | |
| 2008/0307449 | A1 | 12/2008 | Stobbe et al. | |

FOREIGN PATENT DOCUMENTS

| EP | 1 225 585 A1 | 7/2002 |
| EP | 1 617 506 A2 | 1/2006 |
| WO | 00/23994 A1 | 4/2000 |
| WO | 2004/099821 A1 | 11/2004 |
| WO | 2005/076205 A1 | 8/2005 |
| WO | 2005/096291 A1 | 10/2005 |

OTHER PUBLICATIONS

International Search Report for Patent Application No. PCT/IB2010/052199 (Sep. 22, 2009).

* cited by examiner

*Primary Examiner* — Will J Klimowicz

(57) ABSTRACT

An apparatus for storing digital media utilizes an electrically conductive element, which is for reading stored digital media, and multiple electrically conductive resonant circuits as an antenna for radio frequency communications. Each of the resonant circuits is electrically isolated from the other resonant circuits and the electrically conductive element is electrically isolated from each of the resonant circuits. As a result, the apparatus for storing digital media has a relatively wide operating frequency range and a relatively long communications range, which allows worldwide usage in various applications. For example, an optically readable compact disk (CD) utilizes a metal layer configured as a reflective surface for reading stored digital media in the CD, an electrically conductive component that is not in contact with a radio frequency identification (RFID) integrated circuit (IC), and an electrically conductive component that is in contact with the RFID IC, as an antenna for the RFID IC.

20 Claims, 11 Drawing Sheets

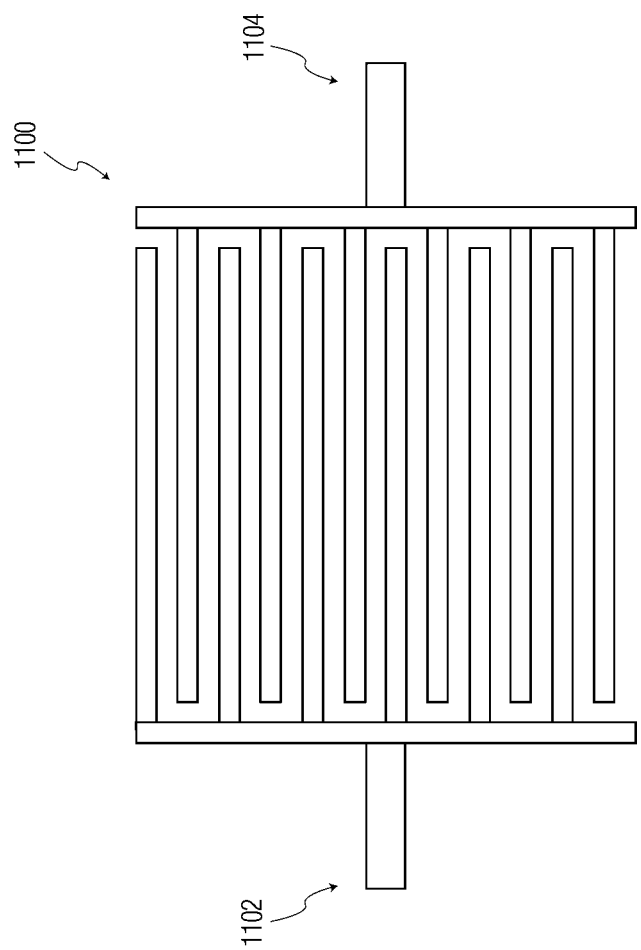

APPARATUS FOR STORING DIGITAL MEDIA THAT INCLUDES A RADIO FREQUENCY IDENTIFICATION SYSTEM

FIELD OF THE INVENTION

Embodiments of the invention relate generally to storage systems and, more particularly, to an apparatus for storing digital media that includes a radio frequency identification (RFID) system.

BACKGROUND OF THE INVENTION

A digital media storage device such as an optically readable compact disk (CD) may include an RFID system to communicate with wireless terminals. For worldwide universal usage, the digital media storage device may require the RFID system to operate in different frequency bands and to communicate with wireless terminals over a relatively long range. A concern with a traditional RFID system is its narrow operation frequency band and limited communications range. As a result, traditional RFID systems have not been for worldwide universal usage with a digital media storage device such as a CD.

SUMMARY OF THE INVENTION

An apparatus for storing digital media utilizes an electrically conductive element, which is for reading stored digital media, and multiple electrically conductive resonant circuits as an antenna for radio frequency communications. Each of the resonant circuits is electrically isolated from the other resonant circuits and the electrically conductive element is electrically isolated from each of the resonant circuits. As a result, the apparatus for storing digital media has a relatively wide operating frequency range and a relatively long communications range, which allows worldwide usage in various applications. For example, a CD utilizes a metal layer configured as a reflective surface for reading stored optically readable digital media in the CD, an electrically conductive component that is not in contact with an RFID integrated circuit (IC), and an electrically conductive component that is in contact with the RFID IC, as an antenna for the RFID IC.

In an embodiment, an apparatus for storing digital media includes a device configured to store digital media and an RFID system coupled to the device. The device has an electrically conductive element for reading stored digital media. The RFID system includes multiple electrically conductive components and an RFID IC electrically coupled to one of the electrically conductive components. Each of the electrically conductive components is a resonant circuit. The RFID IC is configured to use the electrically conductive components and the electrically conductive element of the device as an antenna. Each of the electrically conductive components of the RFID system is electrically isolated from any other electrically conductive component of the RFID system and the electrically conductive element of the device is electrically isolated from each of the electrically conductive components of the RFID system.

In an embodiment, an apparatus for storing optically readable digital media includes an optical disk configured to store optically readable digital media and an RFID system coupled to the optical disk. The optical disk has a metal layer configured as a reflective surface for reading the optically readable digital media stored in the optical disk. The RFID system includes multiple electrically conductive components attached on top of the optical disk and an RFID IC electrically coupled to one of the electrically conductive components. Each of the electrically conductive components is a resonant circuit. The RFID IC is configured to use the electrically conductive components and the metallization layer of the optical disk as an antenna. Each of the electrically conductive components of the RFID system is electrically isolated from any other electrically conductive component of the RFID system and the metal layer of the optical disk is electrically isolated from each of the electrically conductive components of the RFID system.

In an embodiment, an apparatus for storing optically readable digital media includes an optical disk configured to store optically readable digital media and an RFID system coupled to the optical disk. The optical disk has a central hub area, a non electrically conductive coating layer formed on top of the central hub area, and a metal layer configured as a reflective surface for reading the optically readable digital media stored in the optical disk. The RFID system includes a non electrically conductive antenna substrate layer formed on top of the coating layer of the optical disk, multiple electrically conductive components attached on top of the antenna substrate layer, and an RFID IC electrically coupled to one of the electrically conductive components. Each of the electrically conductive components is a resonant circuit, which has a resonant frequency and an inductance. The resonant frequency is equal to a center frequency of an operation frequency band of the RFID system and the inductance depends on dimensions of the resonant circuit. The RFID IC is configured to use the electrically conductive components and the metallization layer of the optical disk as an antenna. Each of the electrically conductive components of the RFID system is electrically isolated from any other electrically conductive component of the RFID system and the metal layer of the optical disk is electrically isolated from each of the electrically conductive components of the RFID system.

Other aspects and advantages of embodiments of the present invention will become apparent from the following detailed description, taken in conjunction with the accompanying drawings, depicted by way of example of the principles of the invention.

BRIEF DESCRIPTION OF THE DRAWINGS

FIG. 11 depicts an example of the capacitor described with reference to FIGS. 5 and 8.

Throughout the description, similar reference numbers may be used to identify similar elements.

DETAILED DESCRIPTION OF THE EMBODIMENTS

Figure 1:
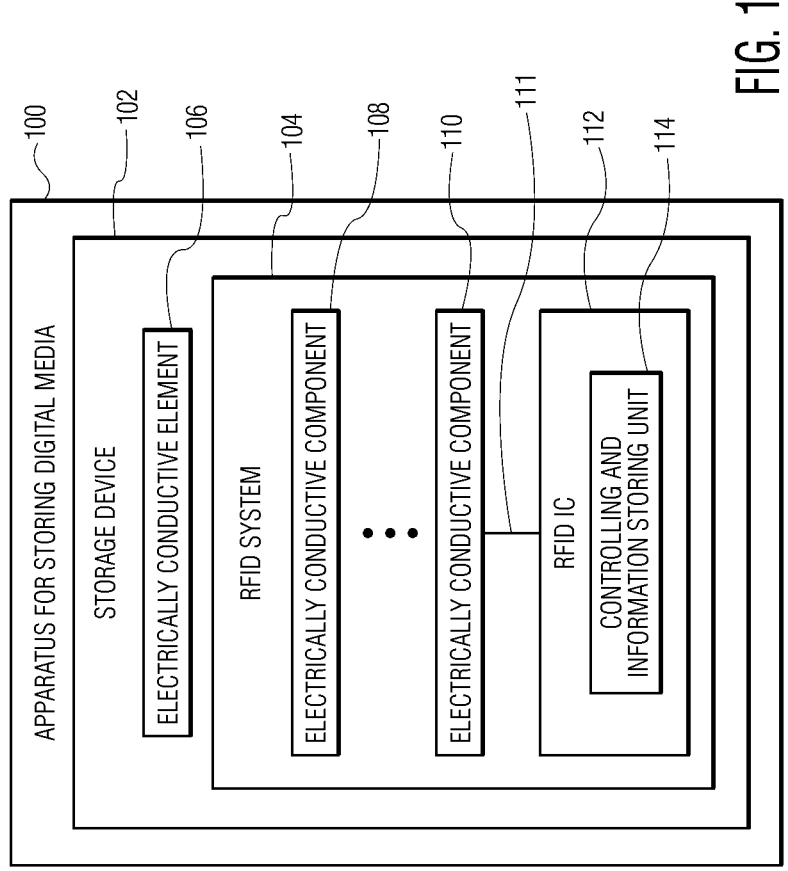
FIG. 1 is a functional block diagram of an apparatus for storing digital media in accordance with an embodiment of the invention.

FIG. 1 is a functional block diagram of an apparatus 100 for storing digital media in accordance with an embodiment of the invention. As shown in FIG. 1, the apparatus for storing digital media includes a storage device 102 and an RFID system 104.

The storage device 102 is configured to store digital media, such as text, audio, still images, animation, and video. The storage device is configured to store the digital media as, for example, optically readable digital media, magnetically readable digital media, electromagnetically readable digital media, or a combination of optically readable digital media, magnetically readable digital media, and electromagnetically readable digital media. The storage device has an electrically conductive element 106 for reading stored digital media. In an embodiment, the storage device is an optical disk that has a metal layer configured as a reflective surface for reading stored optically readable digital media.

The RFID system 104 is coupled to the storage device 102 and includes multiple electrically conductive components 108, 110 and an RFID integrated circuit (IC) 112. The RFID IC is electrically coupled to one of the electrically conductive components of the RFID system. In the embodiment of FIG. 1, the RFID IC is electrically coupled to the electrically conductive component 110 via conductive path 111. The RFID system may be an active RFID system, which includes an internal power supply such as a battery, or a passive RFID system, which has no internal power supply and relies on power emitted by an RFID reader.

Each of the electrically conductive components of the RFID system 104 is a resonant circuit. Although the RFID system shown in FIG. 1 includes two electrically conductive components 108, 110, the RFID system may include more than two electrically conductive components.

Each of the electrically conductive components of the RFID system 104 is electrically isolated from any other electrically conductive component of the RFID system. That is, there are no electrically conductive paths, such as conductive metal traces, between the electrically conductive components of the RFID system. The coupling between two electrically conductive components of the RFID system is through an electromagnetic field between the two electrically conductive components of the RFID system. In the embodiment of FIG. 1, the electrically conductive component 108 is electrically isolated from the electrically conductive component 110.

The electrically conductive element 106 of the storage device 102 is electrically isolated from each of the electrically conductive components of the RFID system 104. That is, there are no electrically conductive paths, such as conductive metal traces, between the electrically conductive element of the storage device and the electrically conductive components of the RFID system. The coupling between the electrically conductive element of the storage device and an electrically conductive component of the RFID system is through an electromagnetic field between the electrically conductive element of the storage device and the electrically conductive component of the RFID system. In the embodiment of FIG. 1, the electrically conductive element of the storage device is electrically isolated from the two electrically conductive components 108, 110 of the RFID system.

Figure 2:
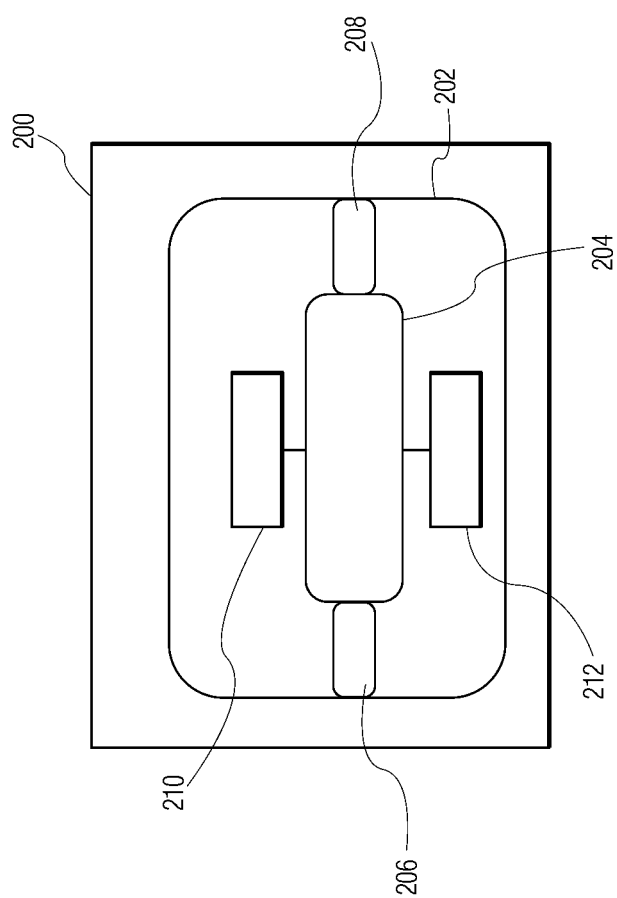
FIG. 2 depicts an example embodiment of the electrically conductive components described with reference to FIG. 1.

Two example embodiments of the electrically conductive components described above with reference to FIG. 1 are described below with reference to FIG. 2 and FIG. 3. As shown in FIG. 2, the electrically conductive component 200 includes an outer loop structure 202, an inner loop structure 204, connection structures 206, 208, and capacitors 210, 212. The outer loop structure, the inner loop structure, and the connection structures are electrically conductive and the connection structures are configured to electrically connect the outer loop structure with the inner loop structure. As shown in FIG. 2, the connection structures are electrically coupled to inner sides of the outer loop structure and electrically coupled to outer sides of the inner loop structure. The outer loop structure, the inner loop structure, and the connection structures can be of any shape. In some embodiments, the outer loop structure and the inner loop structure are circular and the connection structures are conical.

Although the electrically conductive component 200 shown in FIG. 2 includes a single outer loop structure 202, a single inner loop structure 204, two connection structures 206, 208, and two capacitors 210, 212, the electrically conductive component may include multiple outer loop structures, multiple inner loop structures, more than two connection structures, and more than two capacitors. In some embodiments, the electrically conductive component may include a single connection structure and a single capacitor.

Figure 3:
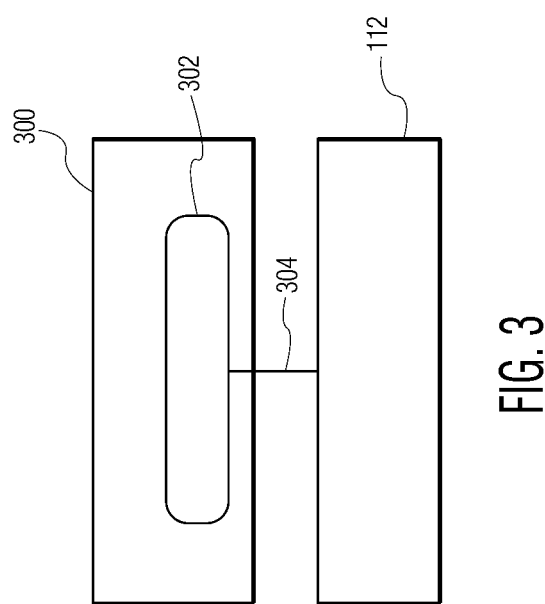
FIG. 3 depicts another example of the electrically conductive components described with reference to FIG. 1.

As shown in FIG. 3, the electrically conductive component 300 includes an electrically conductive loop structure 302. The loop structure is electrically coupled to an RFID IC 112 via an electrically conductive path 304 such as a conductive metal trace. The loop structure can be of any shape, including, for example, rectangular.

Referring back to FIG. 1, the RFID IC 112 includes a controlling and information storing unit 114. In an embodiment, the controlling and information storing unit is configured to store identification information of the apparatus 110 and to transmit the stored identification information to a wireless terminal (not shown). Additionally, the controlling and information storing unit may be configured to store other information such as electronic currency tokens and/or digital security information and to transmit the additional information to a wireless terminal. Furthermore, the controlling and information storing unit may be configured to store information received from a wireless terminal.

The RFID IC 112 is configured to use the electrically conductive components 108, 110 of the RFID system 104 and the electrically conductive element 106 of the storage device 102 as an antenna to communicate with a wireless terminal (not shown). That is, the RFID IC uses the storage device as an integral part of the antenna for radio frequency communications. As described above, each of the electrically conductive components of the RFID system is a resonant circuit, each of the electrically conductive components is electrically isolated from the other conductive components of the RFID system, and the electrically conductive element of the storage device is electrically isolated from each of the electrically conductive components of the RFID system. Because of the electrical isolations of the electrically conductive components of the RFID system and the electrically conductive element of the storage device and the resonance nature of the electrically conductive components of the RFID system, the electromagnetic characteristics of the antenna of the RFID IC is improved. Compared to a traditional RFID system that does not have the above-described features, the RFID system described herein has a wider operating frequency range and a longer communications range than a traditional RFID system, thereby allowing worldwide usage in various applications.

The RFID system 104 can be coupled vertically over the storage device 102 or coupled in parallel with the storage device. Additionally, the RFID system may be coupled to the top of the storage device, to the side of the storage device, to the back of the storage device, or to a combination of the top of the storage device, the side of the storage device, and the back of the storage device. The position of the RFID system relative to the storage device may be chosen to achieve a predefined communications range and/or a predefined operation frequency band of the RFID system.

Figure 4:
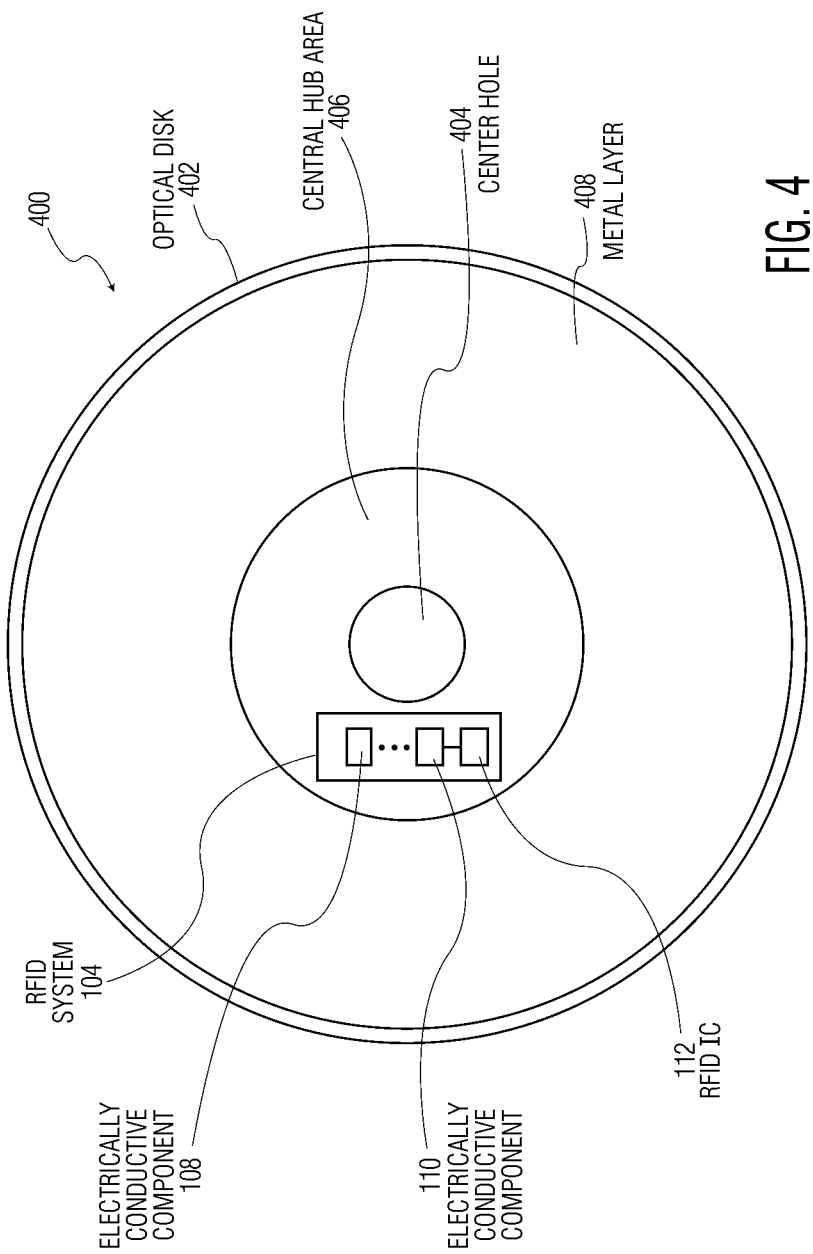
FIG. 4 is a schematic block diagram of an apparatus for storing optically readable digital media in accordance with an embodiment of the invention.

The apparatus 100 is configured to store the digital media as, for example, optically readable digital media, magnetically readable digital media, electromagnetically readable digital media, or a combination of optically readable digital media, magnetically readable digital media, and electromagnetically readable digital media. FIG. 4 depicts an exemplary embodiment of the apparatus of FIG. 1 in which the apparatus for storing digital media is an optical disk such as a CD that stores optically readable digital media. As shown in FIG. 4, the apparatus 400 includes an optical disk 402 and an RFID system 104 coupled to the optical disk.

The optical disk 402 may be, for example, an optically readable compact disk (CD), Digital Versatile Disc (DVD), Blu-ray Disc (BD), Universal Media Disc (UMD), Holographic Versatile Disc (HVD), Magneto-optical disc, Laserdisc (LD), Hi-MD disk, Super Audio CD (SACD), Video compact disk (VCD), Super Video compact disk, Enhanced Versatile Disc (EVD), Ultra Density Optical (UDO) disk, Versatile Multilayer Disc, China Blue High-Definition optical disk, Layer-Selection-Type Recordable Optical Disk, or any other type of optical disk, which is configured to store optically readable digital media. As shown in FIG. 4, the optical disk has a center hole 404, a central hub area 406 and a metal layer 408. The center hole is in the center of the optical disk, the central hub area surrounds the central hole, and the metal layer is located outside the central hub area. The metal layer, which is typically aluminum although other types of metals are possible, is configured as a reflective surface for reflecting laser light that is used to optically read stored digital media.

In the embodiment of FIG. 4, the RFID system 104 is coupled to the top of the optical disk 402 and includes an RFID IC 112 and multiple electrically conductive components 108, 110. Each of the electrically conductive components 108, 110 of the RFID system is a resonant circuit, the electrically conductive component 108 is electrically isolated from the electrically conductive component 110, and the metal layer of the optical disk is electrically isolated from the electrically conductive components 108, 110 of the RFID system.

The RFID IC 112 is configured to use the electrically conductive components 108, 110 of the RFID system 104 and the metal layer 408 of the optical disk 402 as an antenna for radio frequency communications with a wireless terminal. That is, the RFID IC uses the optical disk as an integral part of the antenna for radio frequency communications. Because of the electrical isolations of the electrically conductive components of the RFID system and the metal layer of the optical disk and the resonance nature of the electrically conductive components of the RFID system, the electromagnetic characteristics of the antenna of the RFID IC is improved. Thus, the RFID system has a relatively wide operating frequency range and a relatively long communications range, which allows worldwide usage in various applications.

Two examples of an apparatus for storing optically readable digital media are described below with reference to FIGS. 5-10. One example is described with reference to FIGS. 5-7 and another example is described with reference to FIGS. 8-10.

Figure 5:
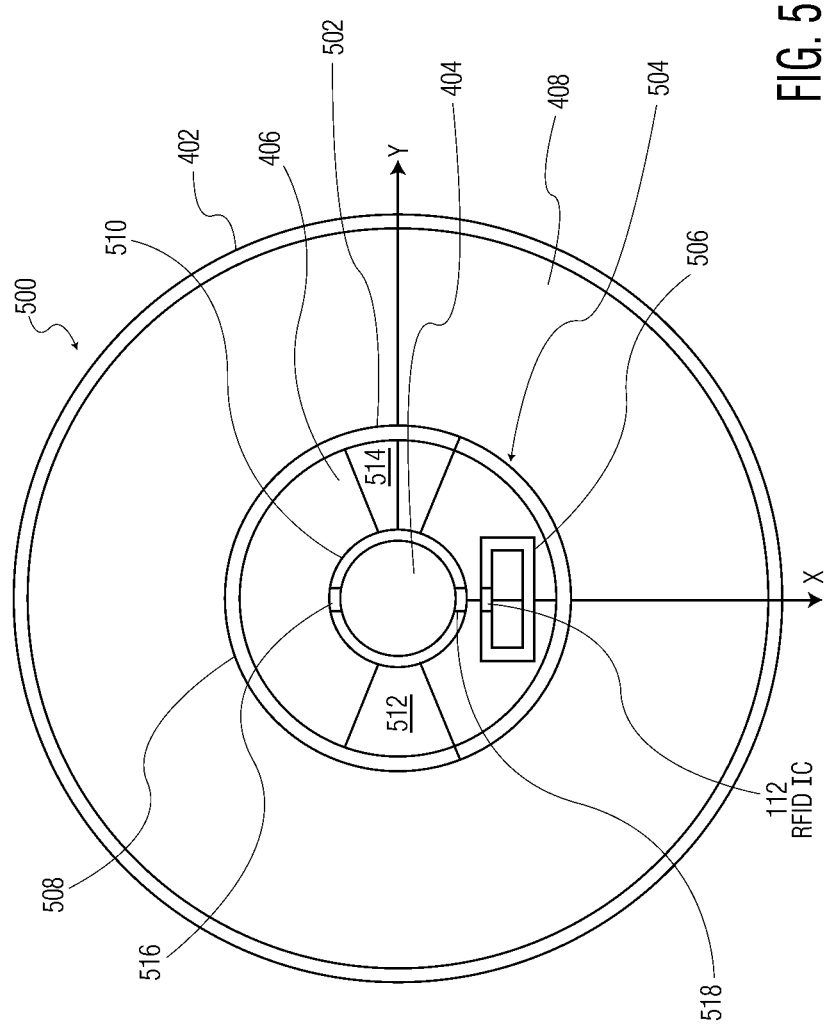
FIG. 5 depicts an exemplary embodiment of an apparatus for storing optically readable digital media.

As shown in FIG. 5, in the exemplary apparatus 500, an RFID system is coupled on top of the central hub area 406 of an optical disk 402. The RFID system includes an RFID IC 112, an electrically conductive component 504 (FIG. 6) that is not in contact with the RFID IC, referred to herein as "a non IC-contacted electrically conductive component," and an electrically conductive component 506 that is in contact with the RFID IC, referred to herein as "an IC-contacted electrically conductive component." As described above, the RFID IC is configured to use the non IC-contacted electrically conductive component, the IC-contacted electrically conductive component, and the metal layer 408 of the optical disk as an antenna for radio frequency communications with a wireless terminal. That is, the RFID IC uses the optical disk as an integral part of the antenna for radio frequency communications.

Both the non IC-contacted electrically conductive component 504 and the IC-contacted electrically conductive component 506 are resonant circuits. In an embodiment, both the non IC-contacted electrically conductive component and the IC-contacted electrically conductive component have a resonant frequency, an inductance, and a capacitance, which satisfy the equation:

$$f_{RES} = \frac{1}{2\pi\sqrt{LC}} \quad (1)$$

where $f_{RES}$ represents the resonant frequency, L represents the inductance, and C represents the capacitance. The resonant frequency is equal to a center frequency of an operation frequency band of the RFID system 502 and the inductance depends on dimensions of the electrically conductive component. In some embodiments, the capacitance is equal to 0.95 pF.

The non IC-contacted electrically conductive component 504 includes an electrically conductive outer ring structure 508, an electrically conductive inner ring structure 510, two electrically conductive conical structures 512, 514, and two capacitors 516, 518. The non IC-contacted electrically conductive component may be made of copper or aluminum. The circular shape of the outer ring structure allows a smooth and lossless transmission of electromagnetic waves from the optical disk 402 to the RFID IC 112, resulting in higher current flow through the optical disk and improved radiation properties. The two conical structures are in electrical contact with inner sides of the outer ring structure and with outer sides of the inner ring structure. In the embodiment of FIG. 5, the opening angles of the two conical structures are the same and the resonant frequency of the non IC-contacted electrically conductive component depends on the opening angles of the two conical structures. In the embodiment of FIG. 5, the two capacitors are electrically connected with the inner ring structure at the upper vertex and the lower vertex of the inner ring structure via electrically conductive paths. The capacitance of the non IC-contacted electrically conductive component depends on capacitances of the two capacitors.

In the embodiment of FIG. 5, the IC-contacted electrically conductive component 506 is an electrically conductive rectangular structure that is in contact with the RFID IC 112. The inductance of the IC-contacted electrically conductive component depends on the width and the length of the rectangular structure. For example, the width and the length of the rectangular structure may be chosen so that the resonant frequency, the inductance, and the capacitance of the IC-contacted electrically conductive component satisfy equation (1) described above. The capacitance of the IC-contacted electrically conductive component is formed by the capacitance of the RFID IC and some parasitic capacitances due to the assembly of the RFID system 502.

Figure 6:
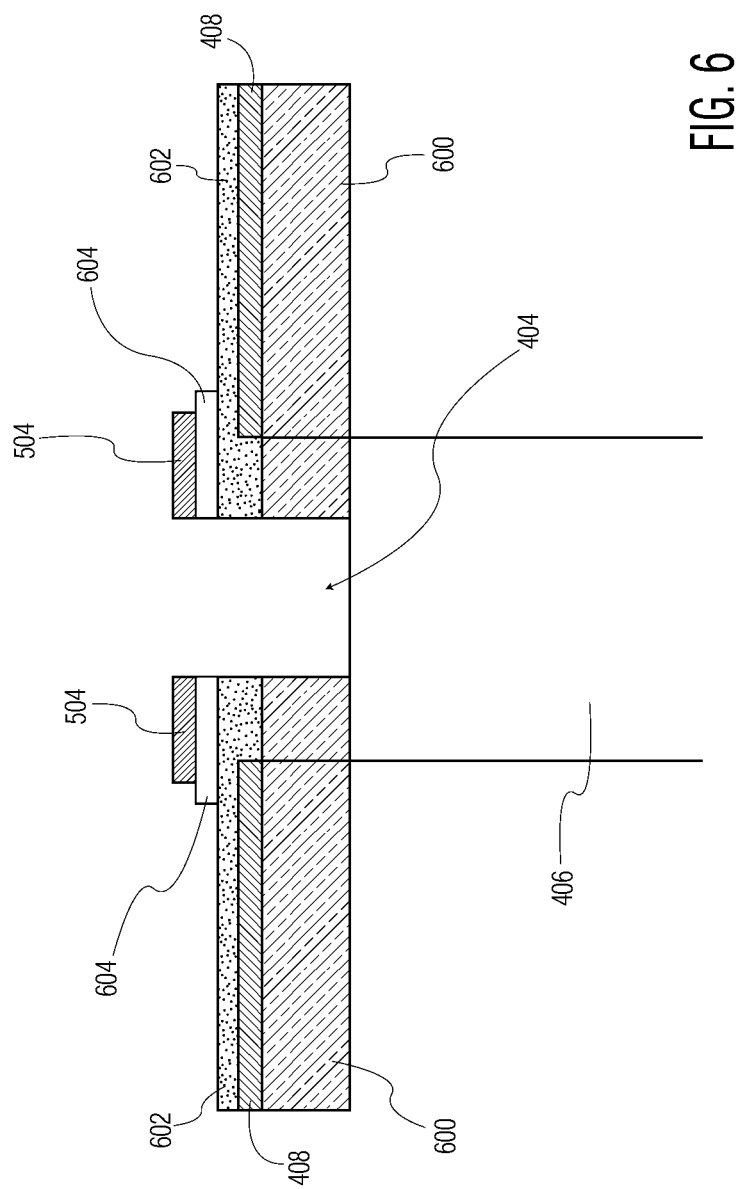
FIG. 6 depicts a cross-sectional view in the YZ-Plane of the exemplary apparatus described with reference to FIG. 5.

FIG. 6 depicts a cross-sectional view in the YZ-Plane of the exemplary apparatus 500 described with reference to FIG. 5. As shown in FIG. 6, the optical disk 402 has a transparent substrate layer 600, for example polycarbonate, which protects optically readable digital media stored in the optical disk. The metal layer 408 is formed on top of the transparent substrate and is typically aluminum although other types of metals are possible. The metal layer is configured as a reflective surface for laser light to reflect off of so that stored digital media can be optically read. A non-electrically conductive coating layer 602, which protects the optical disk, is formed on top of the transparent substrate layer and the metal layer. The coating layer may be made of plastic. The RFID system 502 further includes a non-electrically conductive antenna substrate layer 604 formed on top of the coating layer of the optical disk. The antenna substrate layer, for example polyethylene, does not cover the center hole 404 of the optical disk. In the embodiment of FIGS. 5 and 6, the non IC-contacted electrically conductive component 504 is attached on top of the antenna substrate layer.

Because the antenna substrate layer 604 of the embodiment of FIGS. 5 and 6 does not cover the center hole 404 of the optical disk 402, the optical disk with the RFID system 502 attached can be played in an optical disk drive that requires an optical disk with an unobstructed center hole. The embodiment of FIGS. 5 and 6 may be used by a retailer to index a new optical disk for sale, such as a CD or a DVD, and to allow the optical disk to transmit index information or artist information about stored digital media even after the first usage of the optical disk.

Figure 7:
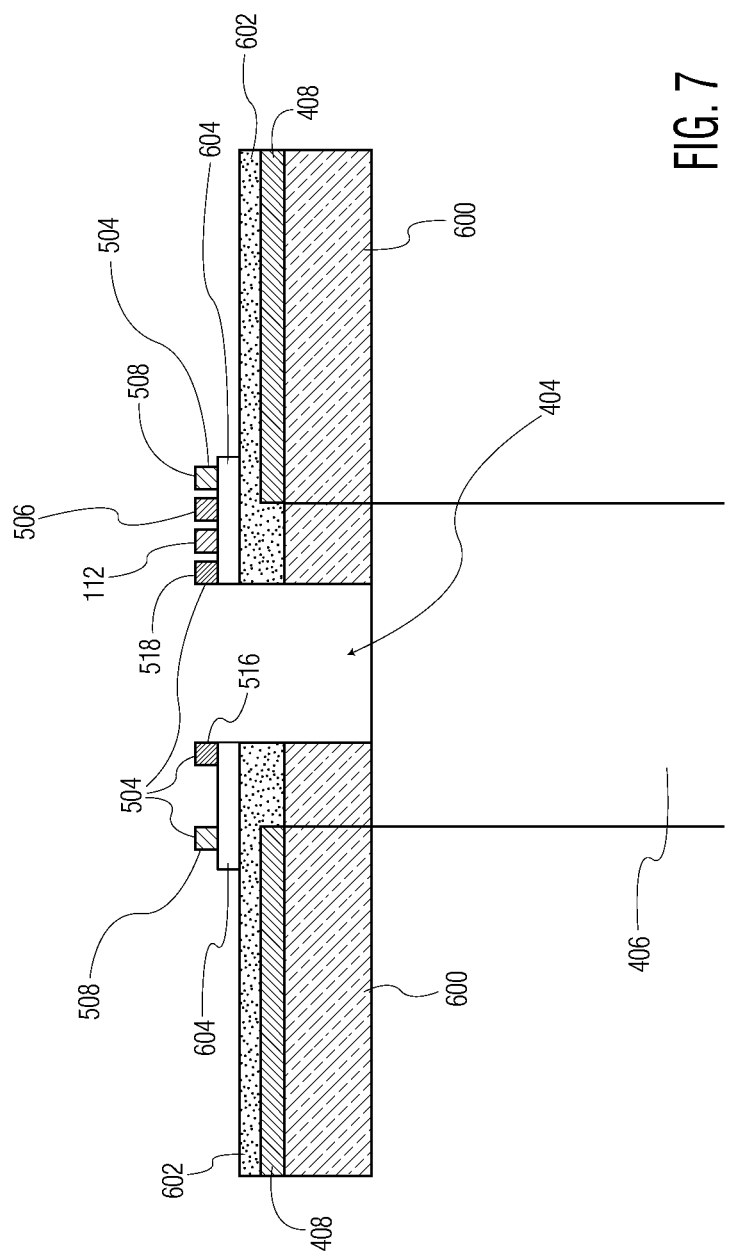
FIG. 7 depicts a cross-sectional view in the XZ-Plane of the exemplary apparatus described with reference to FIG. 5.

FIG. 7 depicts a cross-sectional view in the XZ-Plane of the exemplary apparatus 500 described with reference to FIG. 5. As shown in FIG. 7, the non IC-contacted electrically conductive component 504 and the IC-contacted electrically conductive component 506 are formed on top of the antenna substrate layer 604. Alternatively, the IC-contacted electrically conductive component may be formed on a separate substrate so that the RFID IC 112 and the IC-contacted electrically conductive component can be attached separately. Because the antenna substrate layer does not cover the center hole 404 of the optical disk 402, the center hole of the optical disk divides the exemplary apparatus into two sides, a left side and a right side. The left side, in an order from left to right, depicts the outer ring structure 508 and the capacitor 516. The right side, in an order from left to right, depicts the capacitor 518, the RFID IC, the IC-contacted electrically conductive component, and the outer ring structure 508.

In the embodiment of FIGS. 5-7, the diameter of the center hole 404 of the optical disk 402 is approximately 15 millimeters (mm), the diameter of the central hub area 406 is approximately 40 mm, and the distance between the two outer edges of the metal layer 408 is approximately 120 mm. The sum of the thickness of the coating layer 602 and the transparent substrate layer 600 is approximately 1.2 mm, the thickness of the metal layer is approximately 75 nanometers (nm), the thickness of the coating layer above the metal layer is approximately 10 micrometers (μm), and the thickness of the antenna substrate layer is approximately 10 μm. The heights of the non IC-contacted electrically conductive component, the IC-contacted electrically conductive component, the capacitors, and the RFID IC are the same and approximately 10 μm. The distance between the two outer edges of the antenna substrate layer is approximately 46 mm and the diameter of the non IC-contacted electrically conductive component is approximately 44 mm. The distance between the upper edge of the RFID IC and the lower edge of the IC-contacted electrically conductive component is approximately 10 mm.

Figure 8:
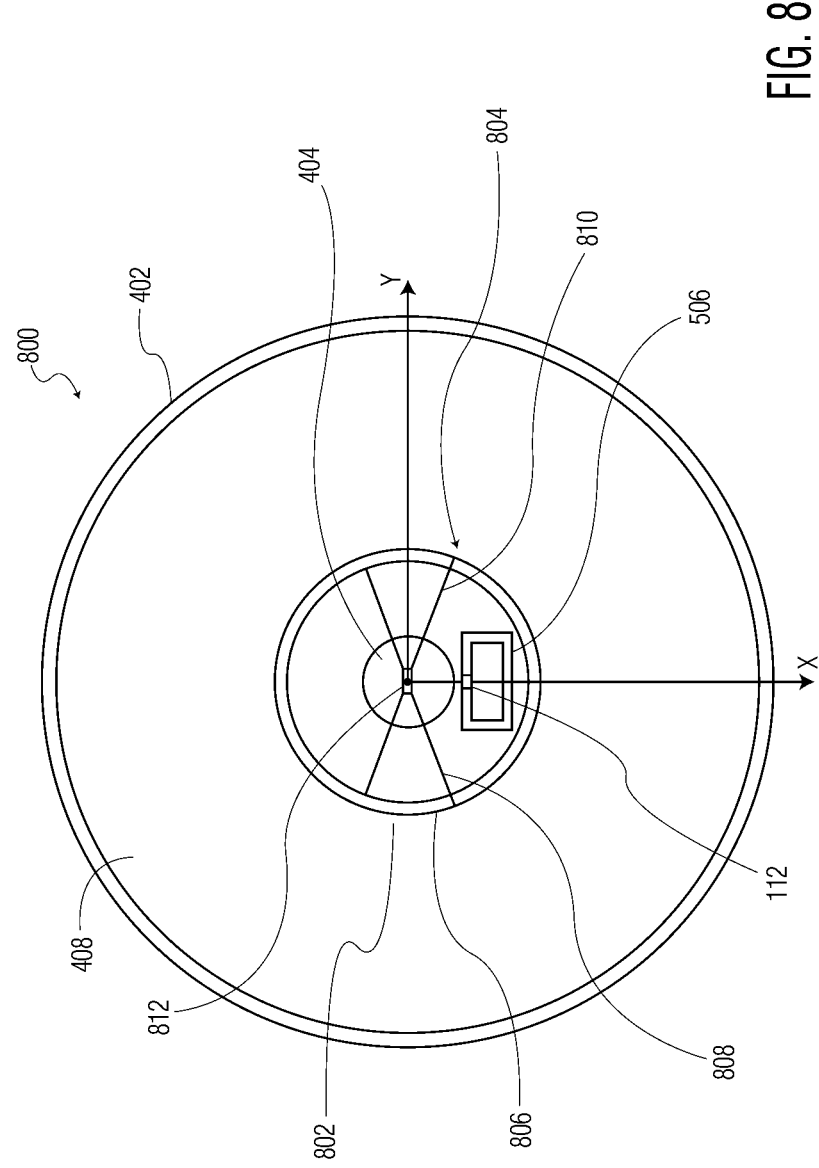
FIG. 8 depicts another exemplary embodiment of an apparatus for storing optically readable digital media.

As shown in FIG. 8, in the exemplary apparatus 800, an RFID system is coupled on top of the central hub area 406 of an optical disk 402. Similar to the RFID system 502, the RFID system 802 includes an RFID IC 112, a non IC-contacted electrically conductive component 804 (FIG. 9), and an IC-contacted electrically conductive component 506. As described above, the RFID IC is configured to use the non IC-contacted electrically conductive component, the IC-contacted electrically conductive component, and the metal layer 408 of the optical disk as an antenna for radio frequency communications with a wireless terminal. That is, the RFID IC uses the optical disk as an integral part of the antenna for radio frequency communications.

Although the exemplary apparatus 800 described with reference to FIG. 8 is similar to the exemplary apparatus 500 described with reference to FIG. 5, there are some differences between the exemplary apparatus 800 described with reference to FIG. 8 and the exemplary apparatus 500 described with reference to FIG. 5. One difference is in the embodiment described with reference to FIG. 8 the antenna substrate layer 604 is formed over the central hub area and the center hole 404 of the optical disk. Another difference is that the non IC-contacted electrically conductive component 804 has a different structure from the non IC-contacted electrically conductive component 504. Because of the similarities between the exemplary apparatus 800 described with reference to FIG. 8 and the exemplary apparatus 500 described with reference to FIG. 5, the previous description of the exemplary apparatus 500 described with reference to FIG. 5, except for the description related to the non IC-contacted electrically conductive component 504 and the coverage of the antenna substrate layer 604, applies also to the exemplary apparatus 800 described with reference to FIG. 8.

With reference to FIG. 8, the non IC-contacted electrically conductive component 804 includes an electrically conductive ring structure 806, two electrically conductive conical structures 808, 810, and a capacitor 812. The circular shape of the ring structure allows a smooth and lossless transmission of electromagnetic waves from the optical disk 402 to the RFID IC 112, resulting in higher current flow on the optical disk and improved radiation properties. The two conical structures are electrically contacted with inner sides of the ring structure and electrically contacted with the capacitor. In the embodiment of FIG. 8, the opening angles of the two conical structures are the same and the resonant frequency of the non IC-contacted electrically conductive component depends on the opening angles of the two conical structures. Compared to the antenna substrate layer 604 of the exemplary apparatus 500, the antenna substrate layer 604 of the exemplary apparatus 800 is also formed over the center hole 404 of the optical disk. The ring structure is attached on top of a portion of the antenna substrate layer that is formed on top of an outer rim of the central hub area 406 of the optical disk. The two conical structures are attached on top of a portion of the antenna substrate layer that is formed partially on top of the central hub area of the optical disk and partially on top of the center hole of the optical disk. The capacitor is attached on top of a portion of the antenna substrate layer that is formed on top of the center hole of the optical disk.

Because the antenna substrate layer 604 of the embodiment of FIG. 8 is formed over the center hole 404 of the optical disk 402, the optical disk with the RFID system 802 attached cannot be played in an optical disk drive that requires an optical disk with an unobstructed center hole. The embodiment of FIG. 8 may be used by a retailer to index a new optical disk for sale, such as a CD or a DVD, and/or to provide a security measure to a new optical disk for sale.

Figure 9:
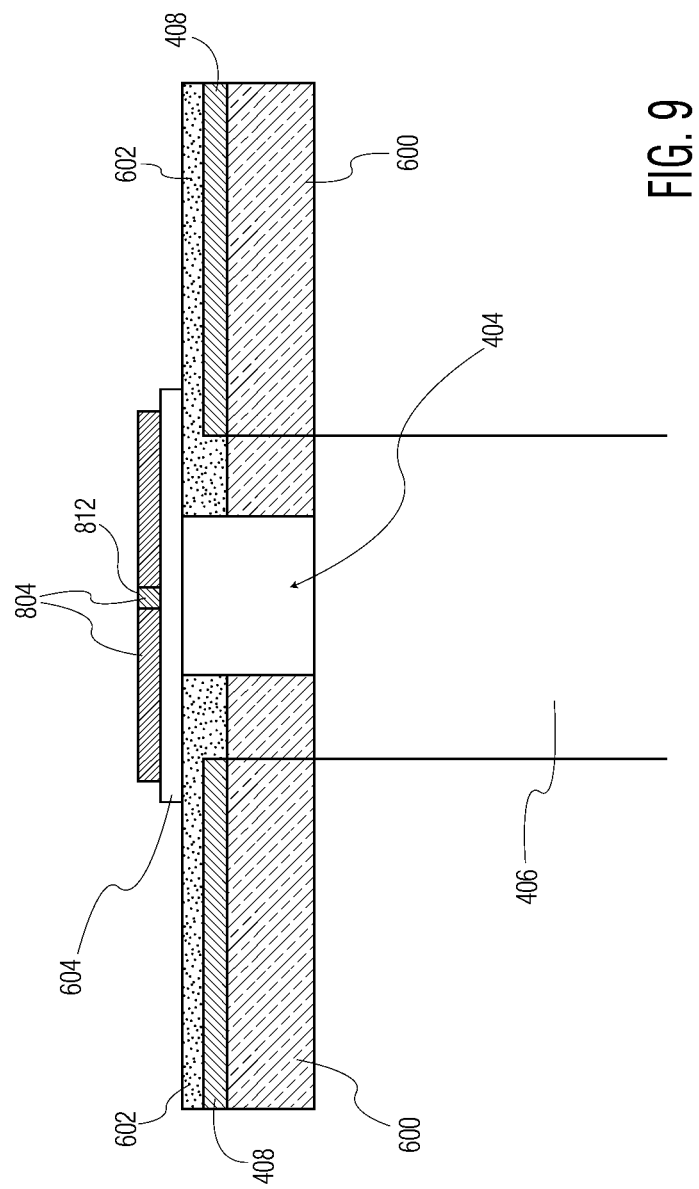
FIG. 9 depicts a cross-sectional view in the YZ-Plane of the exemplary apparatus described with reference to FIG. 8.

FIG. 9 depicts a cross-sectional view in the YZ-Plane of the exemplary apparatus 800 described with reference to FIG. 8. As shown in FIG. 9, the antenna substrate layer 604 covers the center hole 404 and the central hub area 406 of the optical disk 402 and the non IC-contacted electrically conductive component 804 is attached on top of the antenna substrate layer 604.

Figure 10:
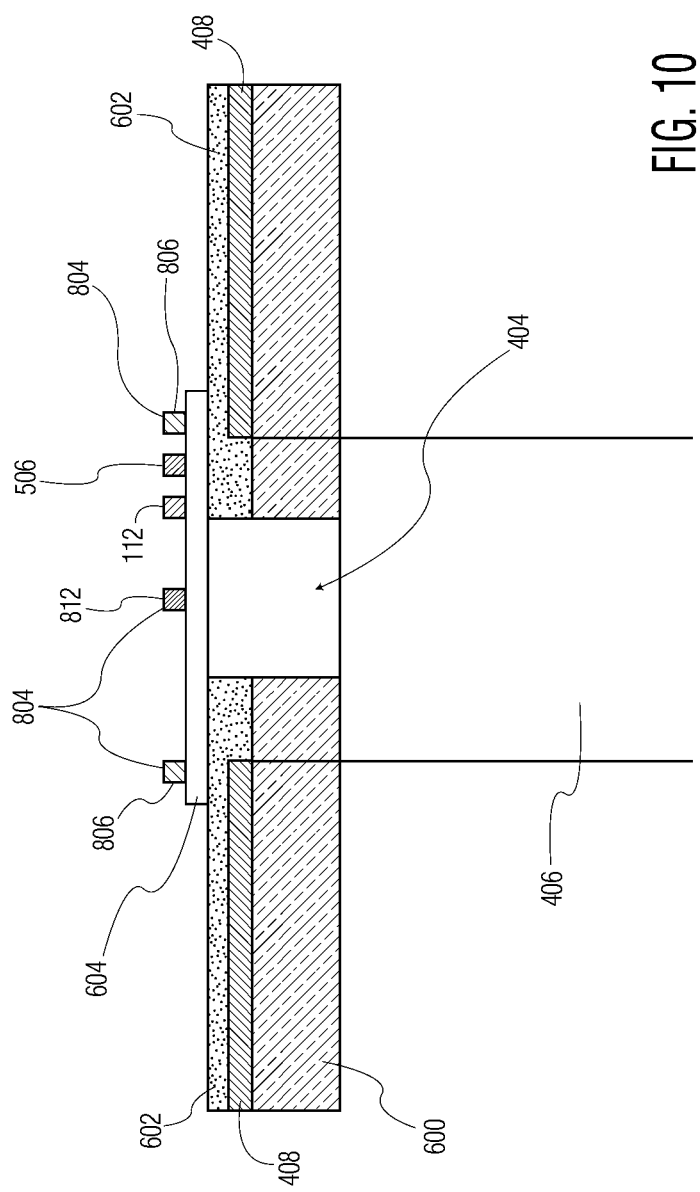
FIG. 10 depicts a cross-sectional view in the XZ-Plane of the exemplary apparatus described with reference to FIG. 8.

FIG. 10 depicts a cross-sectional view in the XZ-Plane of the exemplary apparatus 800 described with reference to FIG. 8. As shown in FIG. 10, the non IC-contacted electrically conductive component 804 and the IC-contacted electrically conductive component 506 are formed on top of the antenna substrate layer 604. Alternatively, the IC-contacted electrically conductive component may be formed on a separate substrate so that the RFID IC 112 and the IC-contacted electrically conductive component can be attached separately. Because the antenna substrate layer covers the center hole 404 and the central hub area 406 of the optical disk 402, the center hole of the optical disk divides the exemplary apparatus into three portions, a left side, the middle, and a right side. The left side depicts the ring structure 806, the middle includes a section view of the capacitor 812, and the right side, in an order from left to right, depicts the RFID IC, the IC-contacted electrically conductive component 506, and the ring structure 806. The heights of the non IC-contacted electrically conductive component, the IC-contacted electrically conductive component, the capacitor, and the RFID IC are the same.

FIG. 11 depicts an example of a capacitor that can be used in the non IC-contacted electrically conductive component 504 described with reference to FIG. 5 and the non IC-contacted electrically conductive component 804 described with reference to FIG. 8. As shown in FIG. 11, the capacitor 1100 is a conductive finger structure having two terminals, terminal A 1102 and terminal B 1104. There is no direct electrical connection between terminal A and terminal B. Each of the terminals is electrically contacted with other structures of the non IC-contacted electrically conductive components of the embodiments of FIGS. 5 and 8. For example, terminals A and B can be electrically contacted with inner ring structure 510 of the non IC-contacted electrically conductive component 504. In another example, terminal A can be electrically contacted with the conical structure 808 of the non IC-contacted electrically conductive component 804, terminal B can be electrically contacted with the conical structure 810 of the non IC-contacted electrically conductive component 804, or vice versa.

The capacitor 1100 can be manufactured in a single process step with the other structures of the non IC-contacted electrically conductive components 504, 804 of the embodiments of FIGS. 5 and 8. For example, the capacitor can be manufactured in a single process step with other structures of the non IC-contacted electrically conductive component 504 by using printing or etching techniques of conductive material, such as copper, aluminum, or silver-ink. The capacitor can also be manufactured in a single process step with other structures of the non IC-contacted electrically conductive component 804 by using printing or etching techniques of conductive material, such as copper, aluminum, or silver-ink. Because the capacitor can be manufactured in a single process step with the other structures of the non IC-contacted electrically conductive components of the embodiments of FIGS. 5 and 8, the manufacturing cost of the non IC-contacted electrically conductive components of the embodiments of FIGS. 5 and 8 are reduced. Additionally, the capacitor can be produced in ultra low height to save spaces.

Traditional RFID systems typically operate in a narrow frequency band and have a maximum communications range of less than 1 meter. The RFID system 502 described with reference to FIG. 5 and the RFID system 802 described with reference to FIG. 8 have an operating frequency range of about 100 megahertz (MHz), for example, around a frequency band 850-960 MHz, and a maximum communications range of about 10 meters, which allows usage in various applications in the United States and Europe.

Although specific embodiments of the invention that have been described or depicted include several components described or depicted herein, other embodiments of the invention may include fewer or more components to implement less or more functionality.

Although specific embodiments of the invention have been described and depicted, the invention is not to be limited to the specific forms or arrangements of parts so described and depicted. The scope of the invention is to be defined by the claims appended hereto and their equivalents.

The invention claimed is:

1. An apparatus for storing digital media, the apparatus comprising: a device configured to store digital media, the device having an electrically conductive element for reading stored digital media; and
    an RFID system coupled to the device, the RFID system comprising:
    a plurality of electrically conductive components, wherein each of the electrically conductive components is a resonant circuit; and
    an RFID IC electrically coupled to one of the electrically conductive components,
    wherein the RFID IC is configured to use the electrically conductive components and the electrically conductive element of the device as an antenna, wherein each of the electrically conductive components of the RFID system is electrically isolated from any other of the plurality of electrically conductive components of the RFID system and the electrically conductive element of the device is electrically isolated from each of the electrically conductive components of the RFID system.

2. The apparatus of claim 1, wherein one of the electrically conductive components comprises:
    an electrically conductive outer loop structure;
    an electrically conductive inner loop structure;
    electrically conductive connection structures configured to electrically connect the outer loop structure with the inner loop structure, the connection structures being electrically coupled to inner sides of the outer loop structure and electrically coupled to outer sides of the inner loop structure; and
    capacitors coupled to the inner loop structure.

3. The apparatus of claim 2, wherein another of the electrically conductive components comprises an electrically conductive loop structure electrically coupled to the RFID IC.

4. An apparatus according to claim 2, and for storing optically readable digital media, wherein:
    the device is an optical disk configured to store optically readable digital media, and a metal layer is configured as a reflective surface for reading the optically readable digital media stored in the optical disk.

5. The apparatus of claim 4, wherein each of the electrically conductive components has a resonant frequency, an inductance, and a capacitance, which satisfies:

$$f_{RES} = \frac{1}{2\pi\sqrt{LC}}$$

where $f_{RES}$ represents the resonant frequency, L represents the inductance, and C represents the capacitance.

6. The apparatus of claim 5, wherein:
the resonant frequency is equal to a center frequency of an operation frequency band of the RFID system;
the inductance depends on dimensions of the electrically conductive component; and
the RFID system has a maximum communications range of about 10 meters and an operating frequency range of about 100 megahertz.

7. The apparatus of claim 4, wherein the optical disk further comprises a central hub area and a non electrically conductive coating layer formed on top of the central hub area, the RFID system further comprising a non electrically conductive antenna substrate layer formed on top of the coating layer of the optical disk.

8. The apparatus of claim 7, wherein the electrically conductive components are attached on top of the antenna substrate layer.

9. The apparatus of claim 8, wherein each of the capacitors comprises a conductive finger structure having a first terminal and a second terminal, no direct electrical connection between the first terminal and the second terminal.

10. The apparatus of claim 8, wherein the outer loop structure is an outer ring structure attached on top of a portion of the antenna substrate layer that is formed on top of an outer rim of the central hub area of the optical disk, wherein the inner loop structure is an inner ring structure attached on top of a portion of the antenna substrate layer that is formed on top of an inner rim of the central hub area of the optical disk, and wherein the connection structures are two conical structures.

11. The apparatus of claim 10, wherein opening angles of the two conical structures are the same and a resonant frequency of the electrically conductive component depends on the opening angles of the two conical structures.

12. The apparatus of claim 8, wherein another of the electrically conductive components comprises an electrically conductive loop structure electrically coupled to the RFID IC.

13. The apparatus of claim 12, wherein the other of the electrically conductive component has a resonant frequency, an inductance, a capacitance, which satisfies:

$$f_{RES} = \frac{1}{2\pi\sqrt{LC}}$$

where $f_{RES}$ represents the resonant frequency, L represents the inductance, and C represents the capacitance.

14. The apparatus of claim 13, wherein:
the resonant frequency of the other of the electrically conductive components is equal to a center frequency of an operation frequency band of the RFID system;
the inductance depends on dimensions of the loop structure; and
the capacitance depends on a capacitance of the RFID IC.

15. The apparatus of claim 13, wherein the loop structure is a ring structure attached on top of a portion of the antenna substrate layer that is formed on top of an outer rim of the central hub area of the optical disk, wherein the connection structures are two conical structures attached on top of a portion of the antenna substrate layer that is formed partially on top of the central hub area of the optical disk and partially on top of a center hole of the optical disk, wherein the capacitor is attached on top of a portion of the antenna substrate layer that is formed on top of the center hole of the optical disk.

16. The apparatus of claim 8, wherein the optical disk further comprises a center hole surrounded by the central hub area, the antenna substrate layer also being formed on top of the center hole of the optical disk, one of the electrically conductive components comprising:
an electrically conductive loop structure;
a capacitor; and
electrically conductive connection structures configured to electrically connect the outer loop structure with the inner loop structure, the connection structures being electrically coupled to inner sides of the loop structure and electrically coupled to the capacitor.

17. The apparatus of claim 7, wherein the optical disk further includes a center hole surrounded by the central hub area.

18. The apparatus of claim 17, wherein the optical disk further comprises a center hole surrounded by the central hub area, the antenna substrate layer also being formed on top of the center hole of the optical disk.

19. The apparatus of claim 4, wherein one of the electrically conductive components includes: an electrically conductive loop structure; and a capacitor.

20. The apparatus of claim 19, wherein one of the electrically conductive components includes electrically conductive connection structures configured to electrically connect the outer loop structure with the inner loop structure, the connection structures being electrically coupled to inner sides of the loop structure and electrically coupled to the capacitor.

* * * * *